REDUCTION OF MULTIPATH EFFECTS BY FREQUENCY SHIFT

Filed Jan. 9, 1959 3 Sheets-Sheet 1

INVENTOR
JAMES L. HOLLIS
BY Homer R. Montague
ATTORNEY

REDUCTION OF MULTIPATH EFFECTS BY FREQUENCY SHIFT

INVENTOR
JAMES L. HOLLIS

BY Homer R. Montague
ATTORNEY

REDUCTION OF MULTIPATH EFFECTS BY FREQUENCY SHIFT

Filed Jan. 9, 1959 3 Sheets-Sheet 3

INVENTOR
JAMES L. HOLLIS

BY Homer R. Montague
ATTORNEY

United States Patent Office 3,020,399
Patented Feb. 6, 1962

3,020,399
REDUCTION OF MULTIPATH EFFECTS BY FREQUENCY SHIFT

James L. Hollis, Silver Spring, Md., assignor to Rixon Electronics, Inc., a corporation of Maryland
Filed Jan. 9, 1959, Ser. No. 785,947
2 Claims. (Cl. 250—8)

This invention pertains to wireless communication, and especially to systems for the reduction of multipath propagation effects in wireless systems which transmit information as discrete impulses or bursts of carrier frequency, such as radio telegraph, radio teletypewriter and similar systems.

All wireless systems of the type with which the invention is concerned are characterized by the fact that the transmitting station and the receiving station are in effect linked by a multiplicity of possible wave propagation paths, the various path lengths being different. Since the wave propagation velocity is for all practical purposes a constant, it follows that the transmission time for a signal, represented by a short impulse of the carrier frequency wave, will depend upon the path length. Where a single original impulse is in effect transmitted over several paths, it will arrive at the receiver either as a set of independent pulses separated by intervals established by the differing propagation times, or in the case of short differences in propagation time, as a single impulse but of lengthened duration due to overlapping of the multiple impulses at the receiver location, or both. While the effect can be overcome, in any particular installation, by reducing the rate at which successive pulses are transmitted, so that all of the received images of the original pulse may die out before the next impulse is transmitted, such a solution severely limits the information-handling capacity of the system. This is because the receiver must in effect be desensitized for the entire duration of all the time required for the dying-out process to be substantially completed, which may be several times the duration of the originally transmitted pulse. The failure of a system to discriminate against those signal images or "echoes" produces a catastrophic rise in error rate whenever the difference in path delay times becomes appreciable compared to the duration of a signal element.

Various systems for the reduction of the multipath phenomenon have been proposed, some of these depending upon the time-separation of the image or echo signals. Thus, where the first echo or image signal is that due to the propagation of the original impulse clear around the earth and thence to the receiver, the path delay will be about 1/7 of a second, and it is possible to eliminate the effect of this image pulse by de-tuning the receiver from the original carrier frequency after the direct-path signal has been received, or at least just prior to arrival of the delayed signal. It is also possible to transmit a second original signal, a mark or space pulse, for example, immediately after the first original signal, by shifting the transmitter carrier frequency to that frequency to which the receiver was de-tuned, so that the latter will be in condition to respond to the direct-path propagation of this second signal, while it is ignoring the multiple echoes of the first original impulse. Various refinements of this basic proposition have been conceived, including for example the continuous or stepwise simultaneous shifting of the transmitted carrier and the receiver tuning, and the use of shifts of the modulations applied to the carrier impulses instead of shifts in the carrier frequency itself.

It is accordingly a principal object of the present invention to provide a wireless transmission and reception system usable at carrier frequencies chosen from a wide range thereof, including high and very high frequencies, and at pulse repetition rates yielding optimum information-handling capacity for the channel selected, and which will operate reliably despite the presence of propagation characteristics producing severe multipath effects. The invention is thus of special value in connection with modern "scatter" communication techniques.

It is a further object of the invention to provide a system of the foregoing general type, in which the discrimination of the system against multiple images or echoes is adequate to provide reliable communication at high pulse repetition rates, even where the difference in path propogation times is relatively large, such as would ordinarily result for example from multiple reflections by reflecting ionospheric layers at different heights above the earth, or from back-scatter to the receiver from a more remote terrestrial reflector.

Still another object of the invention is to provide a system of the type described, in which provision is made for the high-speed stepwise frequency shifting or translation of both the transmitter and the receiver frequencies by amounts optimally related to the prevailing standards of transmission for radio tele-printer or the like operations, to the end that the required bandwith will be kept as small as possible consistent with the objects to be achieved. Yet another object is to accomplish these ends while generally conforming to the use of existing apparatus wherever possible, and with a minimum number of changes both in equipment and in operating techniques.

A further object of the invention is to provide a system of the above type in which control of the envelope shape or waveform of the keying pulses is exercised, in combination with suitable filters at the receiver, further to improve the rejection of unwanted multipath signals without undesirable increases in the system bandwith or changes in the operating parameters.

In general, the invention accomplishes all of the above objects by means of a transmitter whose carrier frequency is periodically shifted from some initial or nominal frequency, in relatively small steps, through a range of several adjacent carrier frequencies, synchronized in relation to the occurrence of the timed mark-space or similar information modulation. At the receiving point, the effective sensitive frequency of the receiver is stepped to the same degree and in synchronism with that of the transmitter, so that in effect the receiver is gated off or desensitized for all late-arriving pulses at the preceding carrier frequency or frequencies, but is available for the reception of direct-path signals corresponding to the next succeeding baud, bit or unit of modulation transmitted at the second step frequency, and so on. By employing the synchronous shifting of both transmitted carrier and receiver tuning, the invention enables the objects of the invention to be accomplished with a very slight and wholly tolerable loss in system simplicity, because while each discrete frequency must be abandoned for the duration of the multipath delay, the adjacent frequency is immediately available for the next bit, and the effective loss merely requires one more frequency step than the quotient obtained by dividing the maximum delay time by the time duration of a bit or baud. After completion of a complete sequence of shifts in the carrier frequency, the transmitter returns to the original first or nominal frequency, and the shifting cycle is thereafter repeated.

In the case of frequency-shift keying, in which carrier energy at two distinct frequencies is used to distinguish as between mark and space conditions at the receiver, complications arise because it is essential that a secondary-path image signal of a mark condition not appear at the frequency-shifted receiver as a space condition, and of course also must not appear as a time-shifted mark condition. The invention provides a system particularly useful and flexible in connection with frequency-shift keying over channels where multipath delays may range from zero up to perhaps 80 milliseconds. Thus, the invention is applicable in the so-called high frequency spectrum up to about 30 megacycles per second, in which multipath delays from zero up to 10 or 12 milliseconds are common, and it is also applicable in the spectrum range above 30 megacycles up to 50 or 60 megacycles, wherein path differences as great as 80 milliseconds have occasionally been observed. By suitable arrangements according to the invention, the effects of multipath delays throughout these ranges can be substantially eliminated.

The manner in which the invention satisfies the above and other objects, and certain preferred embodiments of the improved apparatus, will best be understood by considering now the following detailed specification of one such system, given by way of illustration and not of limitation, and referring to the accompanying drawings, in which.

Figure 1:
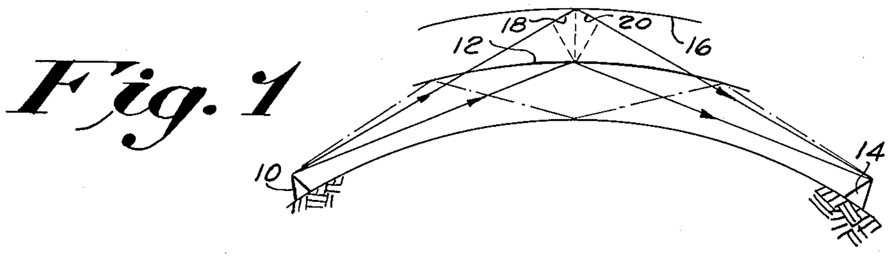
FIGURE 1 is a diagrammatic view of the mechanism of multipath propagation in the case of (*a*) reflections from ionospheric layers at different heights, and (*b*) from a single layer due to multiple impingement.

A commonly accepted mechanism for one type of multipath propagation is illustrated in FIGURE 1 of the drawings, in which a signal from the transmitter 10 is reflected at an ionospheric layer 12 and scattered forwardly over a direct path to a receiver 14. The same original signal is also scattered or reflected to the receiver 14 over a longer path due to reflection at a second and higher layer 16. The increase in path length for the signal reflected at 16 is indicated by the segments 18 and 20, and the corresponding travel time over this increment of path length gives rise to the observed echo or image delay at the receiver. If the delay is shorter than the time duration of the original signal impulse, the receiver will in effect receive the original signal for an extended time, and if this apparent signal length is much longer than the transmitted signal, it will reduce or eliminate the normal time spacing between receipt of mark and space signals. It may even cause the original mark signal to continue into a period in which a succeeding space signal is being received, with disastrous results since the receiving equipment will have no basis on which to make the necessary decision as to whether a mark or space impulse is to be registered. Even with very slow signal repetition rates, a single mark signal may give rise to two or more received mark signals, if the delay increment is longer than the normal duration of the pulse as originally transmitted at 10. In an obvious way, illustrated in chain lines, multiple paths can also arise from a single layer, where the beam is for example twice reflected from layer 12.

Figure 2:
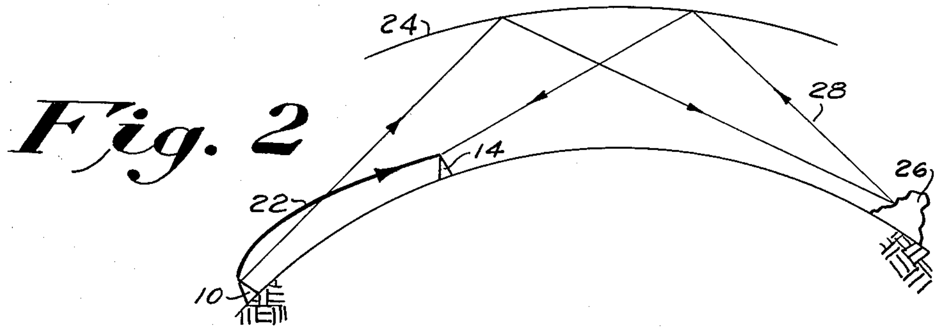
FIGURE 2 is a similar diagram illustrating the effect of back-scatter.

FIGURE 2 illustrates another way in which delayed signals may be produced. Here the transmitter 10 and receiver 14 are shown as connected by a relatively short scatter path 22, while a portion of the original signal energy is reflected as by an F layer 24 to a ground scatter point 26 which may lie many miles beyond the intended receiver location at 14. The echo path back from the scatter point to the receiver 14 is indicated by numeral 28, and under severe conditions the signal intensity at the receiver due to this long-delayed reflection may be very appreciable as compared to the direct transmission.

Figure 3:
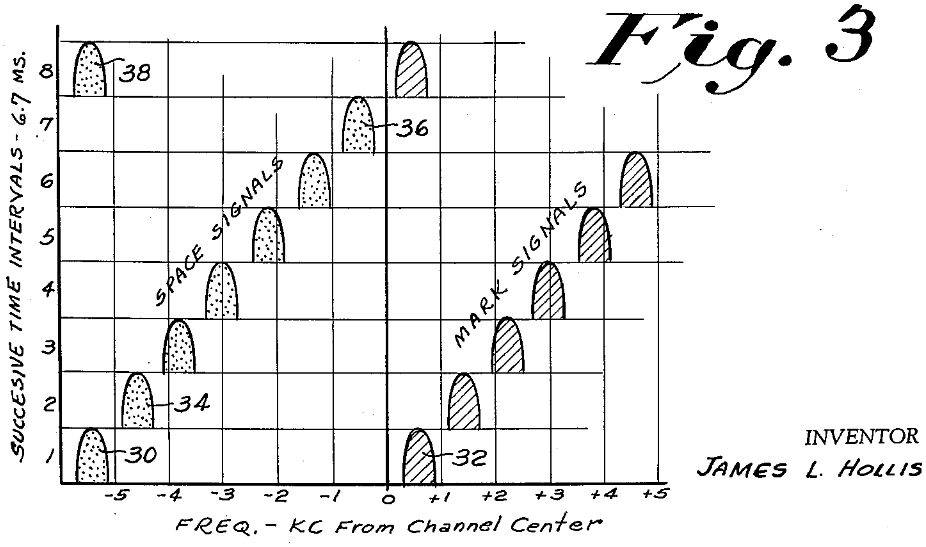
FIGURE 3 is a diagram of the time intervals occupied by successive space (and mark) signals according to one system under the invention, plotted against the respective values of carrier frequency expressed as deviations from the center frequency of the channel.

For the purpose of explaining the technique of the present invention, a system based upon a conventional standard teleprinter circuit will be described, operating at a signal rate of 75 mark-space signals (150 bits) per second, with a change in carrier frequency of 6 kilocycles per second between the mark and space conditions; that is, a shift of 3 kilocycles from the nominal center frequency of the channel. In FIGURE 3, numeral 30 designates an originated space pulse having a time duration of very nearly 6.7 milliseconds ($\frac{1}{150}$ of a second), and numeral 32 designates an originated mark pulse of the same duration. As shown, the frequency positions of the two kinds of pulses are separated by 6 kilocycles; the space pulse occurring when the carrier frequency is about 5.5 kilocycles below the channel center, and the mark pulse occurring when the carrier frequency is about 0.5 kilocycles above the channel center.

As normally employed, the succeeding space pulse would occur at the same carrier frequency as did space pulse 30, but according to the invention the second space pulse 34 will occur at a carrier frequency which is stepped slightly towards the channel center, namely by an amount equal to the mark-space shift divided by the number of such steps employed. In FIGURE 3, a system employing a total of seven shifts is illustrated, so that the carrier frequency for the second space pulse 34 is displaced from the channel center-frequency by about 5.5 kilocycles less $\frac{1}{7}$ of 6 kc., or about 4.6 kc., as shown. In speaking of the carrier frequency at mark and space, it may be taken that the frequency at the center of the mark or space is referred to; whether the carrier is shifted sharply, as by keying alternate oscillators, or in a true frequency modulation fashion, by a passage through intermediate frequencies, will affect the shapes of the pulses in FIGURE 3, but not their essential frequency-displacement relationships.

At the time of the seventh space pulse, designated by numeral 36, the carrier frequency for space will be about 0.5 kc. below the channel center. The carrier frequency for the next space pulse will be returned to the same value as for space pulse 30, as indicated by space pulse 38. The result of the stepping process is that (since the receiver's sensitive frequency has been stepped in synchronism with the transmitted carrier) any images or echoes of the original space pulse 30 which arrive at the receiver, during an interval of one complete stepping cycle, will be disregarded. Not for a time duration equal to 7 complete pulses will the receiver again be able to receive an impulse of the frequency of original space pulse 30. In the system shown, this perfectly guarded interval will be seven times 6.7 milliseconds, or about 47 milliseconds. However, this assumes ideal control of the shape of the keying wave and perfect step filters at the receiver. In a practical case, it is quite possible to achieve rejection factors of 20 decibels (db) for signals delayed from zero to 6.7 milliseconds, 40 decibels from 6.7 to 33.5 milliseconds, and 20 decibels from 33.5 to 40 milliseconds. Even greater rejection ratios might be obtained with improved receiver filters.

It will be seen from the foregoing that the system of the invention has provided a very substantial improvement in multipath signal rejection, and this without any appreciable increase in the bandwidth of the system. Basically, the improvement results from the use of system bandwidth which is inherently dictated by the use of a 6 kc. frequency shift as between the mark and space conditions. In any such system, the invention provides for the indicated improvement without any loss in keying or channel speed and without appreciable increase in the spectrum required for system operation. These two improvements make the system of the invention a practical manner of operation, as contrasted with prior multipath elimination schemes involving reduced keying speeds or requiring increased propagation bandwidth, or both.

Figure 4:
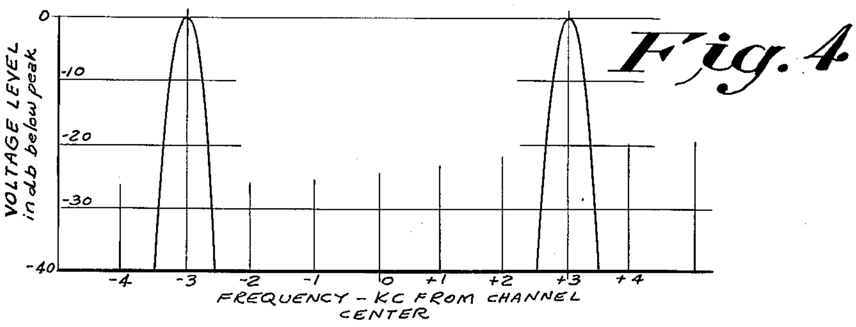
FIGURE 4 is a spectrum diagram showing the pulse waveform of a mark and space pulse in terms of voltage level against frequency deviation, for an ideal keying envelope shape.
Figure 5:
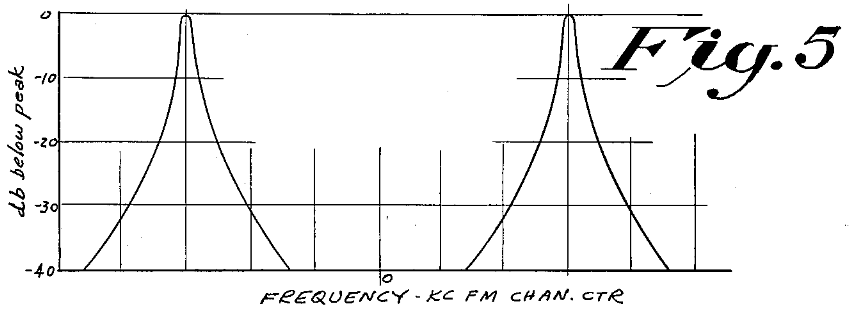
FIGURE 5 is a view similar to FIGURE 4 showing the mark and space pulse waveforms for the case of square wave keying.
Figure 6:
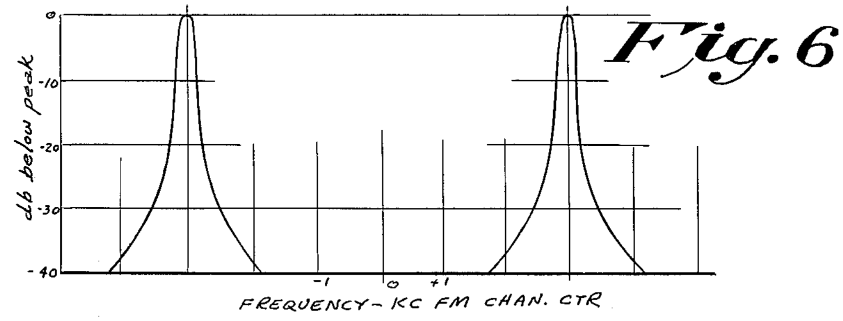
FIGURE 6 is a similar diagram of the mark and space waveforms which can be realized by a practical embodiment of the equipment according to the invention, yielding a considerably narrower spectral spread than in the case of square wave keying.

Obviously, for this system to function as intended, the radiated energy from the transmitter must be reasonably confined to the frequency region immediately surrounding the mark and space frequencies employed. Ideally, the transmitter should emit mark and space signals that are independently amplitude modulated with a gaussian amplitude characteristic, yielding a spectrum distribution as indicated in FIGURE 4 of the drawings. As a practical matter, such a narrow energy distribution cannot be obtained with commercial frequency shift keyed transmitters operating in class C or containing class C stages in the excitation system. Such transmitters when keyed with a square wave would produce a spectrum distribution of energy of the type indicated in FIGURE 5 of the drawings; the square wave example is illustrated because it will produce the maximum spectral spread, and any other arbitrarily chosen wave shape will involve a smaller spread. As will be seen from an inspection of this figure, carrier energy will be radiated over a considerably wider range of frequencies (about 3 kc. each for the mark and space conditions) than in the ideal case of FIGURE 3. By a suitable control over the system paramaters, a reasonable approximation to the ideal case can be made, as illustrated in FIGURE 6, wherein a spectrum spread of about 2 kc. is illustrated for mark and space conditions.

In the case of true FM keying, control of the spectrum spread is obtained principally by appropriate shaping of the D.C. keying pulses. In the case in which frequency shift is obtained by shifting a single oscillator between two frequency limits, with the carrier passing through the intermediate values of frequency, the bias and drive adjustments of all of the amplifiers following the keying point are as important as the initial shaping of the keying wave, and attention will have to be given to all of these parameters.

Figure 7:
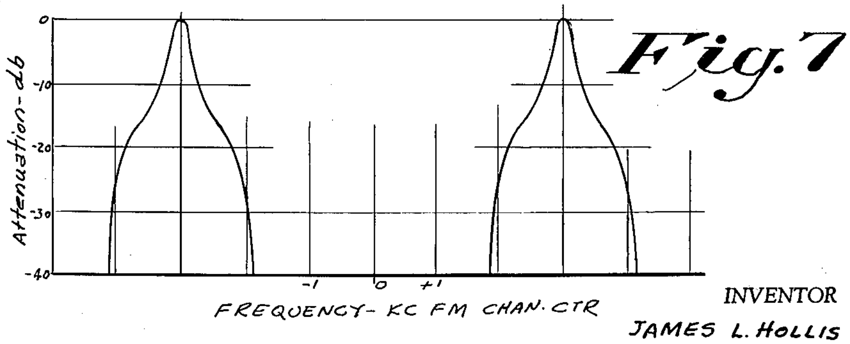
FIGURE 7 is still another diagram, illustrating the channel selectivity of a typical receiver for mark and space frequencies.

The filters employed in the receiver must also be appropriately designed, and should have a bandwidth commensurate with the keying rate employed. In the above discussion, a system using a band rate of 75 cycles (mark and space) per second has been considered. It is well known that a 3 db bandwidth of 225 cycles is about the minimum that can be employed without resorting to special and complicated synchronous detection techniques. A typical response characteristic for the receiver filters employed in a successful operational test is given in FIGURE 7 of the drawings.

Figure 8:
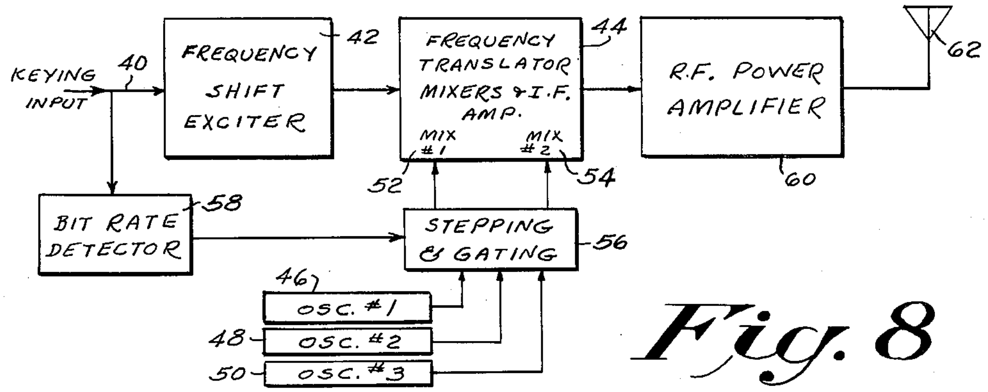
FIGURE 8 is a schematic block diagram of one form of equipment for transmitting signals in accordance with the invention.

A typical arrangement of the transmitting equipment for a seven step frequency change is illustrated in FIGURE 8 of the drawings. Here the keying input lead is indicated at 40, supplying to the frequency shift exciter 42 a pulsed direct current or other suitable representation of the mark and space sequence desired to be transmitted. Exciter 42 produces the two basic carrier frequencies, separated in the example described by the 6 kc. frequency shift normally used to distinguish the mark and space conditions. For simplicity, the system is illustrated as arranged for a single input keying channel, but time division multiplexing can readily be incororated in accordance with standard practice if desired.

The two basic exciter output frequencies then pass to the frequency translating equipment 44 which includes two separate mixers and the usual intermediate frequency amplifier stages. The first mixer 52 will convert the input frequency to a value of about 5 megacycles per second, while the second mixer will convert the 5 megacycle intermediate frequency to a value at or near the incoming frequency. For the first three frequency steps, the three oscillators 46, 48 and 50 are connected to the grids of the first and second mixers 52 and 54 in succession, to provide frequency-translated outputs which are respectively 2400 cycles, 1600 cycles and 800 cycles higher than the input frequency. For the fourth step one oscillator is connected to both mixers to allow the output and input frequencies to be identical. The next three steps are produced by re-connecting the three oscillators to the first and second mixer, in inverse order and with reversed connections to produce output frequencies which are 800, 1600 and 2400 cycles lower than the input frequency. The same frequency translations will occur for the respective mark and space frequencies of the inputs.

According to the invention, it is necessary for these frequency translations to be made in step with the bit information received over the input keying line 40. For this reason, a separate bit rate detector 58 is energized from the input lead 40 and controls the gating circuit equipment 56. A thyratron ring type of sequence control is adaptable to the purposes of the stepping and gating control, controlling the sequential connection of the three oscillators to the first and second mixers. Such a ring is well illustrated in U.S. Patent 2,573,316 of October 30, 1951, and numerous other patents. From the output of the second mixer, the frequency-translated information is delivered to the usual power amplifier 60 and thence to the antenna indicated at 62.

Figure 9:
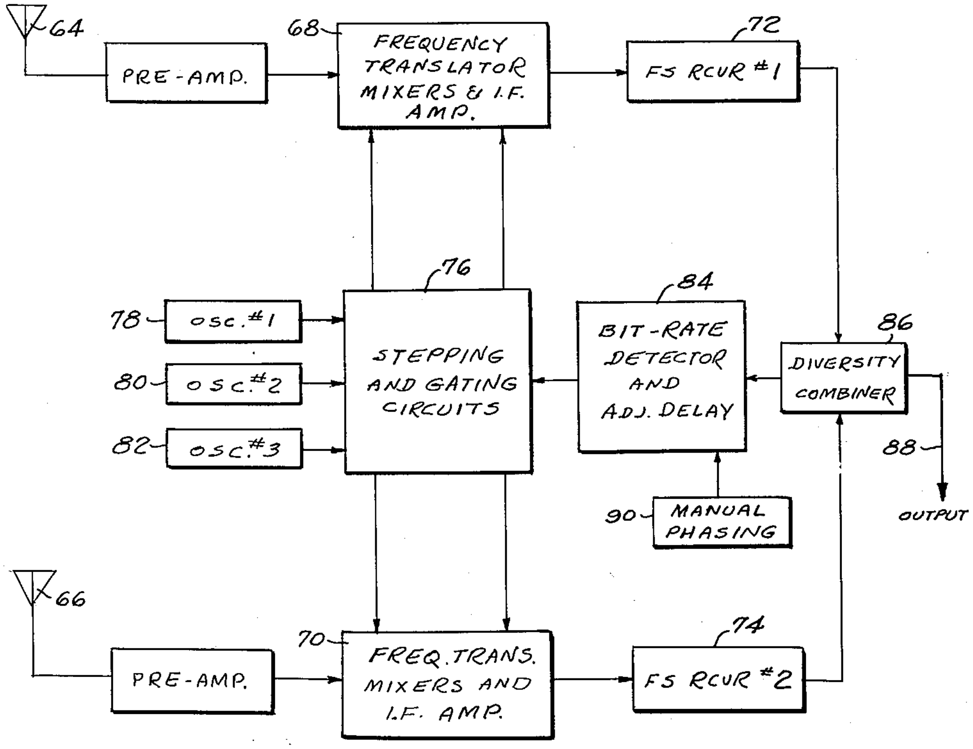
FIGURE 9 is a similar diagram of a typical form of receiver equipment according to the invention.

FIGURE 9 illustrates a possible arrangement of the receiving equipment, here shown as arranged for diversity reception from two antennas 64 and 66. Each antenna feeds a preamplifier which delivers a signal to its frequency translator equipment 68, 70 arranged to translate the incoming signal in 800 cycle steps in reverse order with respect to the transmitter steps, so that an apparent single frequency is presented to the frequency-selective portions of the respective diversity receivers 72, 74. Actually, the receivers will of course receive the two frequencies represented by the 6 kc. frequency shift in a frequency-shift keyed system as described above. The mixers of the two translator equipments 68 and 70 can be energized by a single set of stepping and gating circuits 76 which selectively connect the translator mixer grids to the three heterodyne oscillators 78, 80 and 82.

The bit rate detector 84 is here energized from the diversity combiner 86 which also feeds the single combined signal output to the receiving teleprinter or other output equipment at lead 88. Inasmuch as one step of frequency translation will occur for each received bit, it is necessary to provide for proper phasing of the receiver stepping circuit with reference to the transmitter stepping circuit 56. A simple manual phasing control is indicated at 90 for this purpose; it may merely be a pushbutton so connected to the thyratron stepping ring as to advance it a step at a time in addition to the bit-rate controlled stepping, until the two steppers have been brought into the proper sequencing relationship. Useful output signal will be obtained only under this condition, which can thus be used as an indication of proper phasing during the start-up of operations on the channel. Thereafter, proper phasing will be assured by the arrival of sequential bits at the receiving antenna or antennas. A further adjustable delay for interpolating between the step times may be provided to ensure that over-all receiver system delays do not cause the stepping to occur during receipt of an individual signal.

The extended discussion above with respect to a particular system is not to be considered an indication that equivalent arrangements for other transmission standards are not feasible. Thus, in the case of a system operating with a mark-space frequency shift of 850 cycles per second, and a 6.7 millisecond pulse length, the use of only three translational frequencies will provide for multipath resjection for any delay time up to 13.4 milliseconds. For such a system, the receiving system is of course always responsive to two frequencies which are separated by 850 cycles. The superimposed frequency stepping or translation must avoid this basic shift, and the steps must thus be either greater than 850 cycles per second, plus a margin, or not more than one-third of 850 cycles. The wide shift would be wasteful of spectrum space, but the narrower shift (about 280 cycles per step) is practical.

A basic problem of such a limited shift is the bandwidth of the signalling element itself. The voltage spectrum of a rectangular pulse of 6.7 milliseconds duration goes through zero at 150 and 300 cycles off carrier, but peaks at —14 db approximately 225 cycles off carrier. By making the frequency steps at least 300 cycles and with proper shaping of the keying pulses at the transmitter, a perfectly workable system results.

The essential characteristic of systems as above described is that the carrier frequency steps shall be great enough to fall outside the ability of the shifted receiver to respond to delayed images of pulses previously transmitted within the expected range of delay times. A corollary imposed by the need for finite bandwidth is that the shift shall be repeated at intervals not too much greater than the maximum delay time of the stated range.

Obviously, where sufficiently high receiver selectivity is available, the number of discrete carrier frequency intervals can be increased without limit, inasmuch as the criterion of effectiveness is the ability of the system to prevent effective reception of the carrier frequency of the images of the next preceding signal. In the limit, a continuously changing carrier frequency could thus be employed, and such an arrangement is intended to be included in the scope of the appended claims.

It will be obvious from what has been said that the invention can be carried out with specifically different arrangements of equipment, so long as the essential relationships between the frequencies employed are preserved. Thus, for other bit rates, a smaller number of frequency translation steps can be employed, and of course the system can be employed with other values of frequency-separation as between mark and space conditions. Extension of the same principle to channels carrying multi-level information, rather than pure binary signals, as for example facsimile signals, can be effected in a manner generally obvious from the foregoing disclosure.

What is claimed is:

1. Apparatus for sequentially converting the carrier frequencies of individual signal pulses by amounts progressively differing, from pulse to pulse, by a constant frequency differential, comprising a mixer, a plurality of fixed-frequency oscillators of different frequencies related by said differential, and a pulse-rate detector; means for supplying pulses of carrier energy in sequence to one input of said mixer, means for connecting said pulse-rate detector to the output of said mixer, and a stepping circuit controlled by said pulse rate detector for selectively connecting said oscillators, in an ordered sequence, to the other input of said mixer.

2. Apparatus for sequentially converting the carrier frequencies of individual signal pulses by amounts progressively differing, from pulse to pulse, by a constant frequency differential, comprising a mixer, a source of oscillations of different frequencies related by said differential, and a pulse-rate detector; means for supplying pulses of carrier energy in sequence to one input of said mixer, means for connecting said pulse-rate detector to the output of said mixer, a stepping circuit controlled by said pulse rate detector for selectively controlling the frequency of said source, and means for connecting said source to the other input of said mixer.

References Cited in the file of this patent

UNITED STATES PATENTS

| | | |
|---|---|---|
| 1,875,165 | Schroter | Aug. 30, 1932 |
| 2,419,570 | Labin et al. | Apr. 29, 1947 |
| 2,895,128 | Bryden | July 14, 1959 |
| 2,901,598 | Bourgonjon et al. | Aug. 25, 1959 |